C. SWEENEY.
Churn.
No. 85,187.
Patented Dec. 22, 1868.
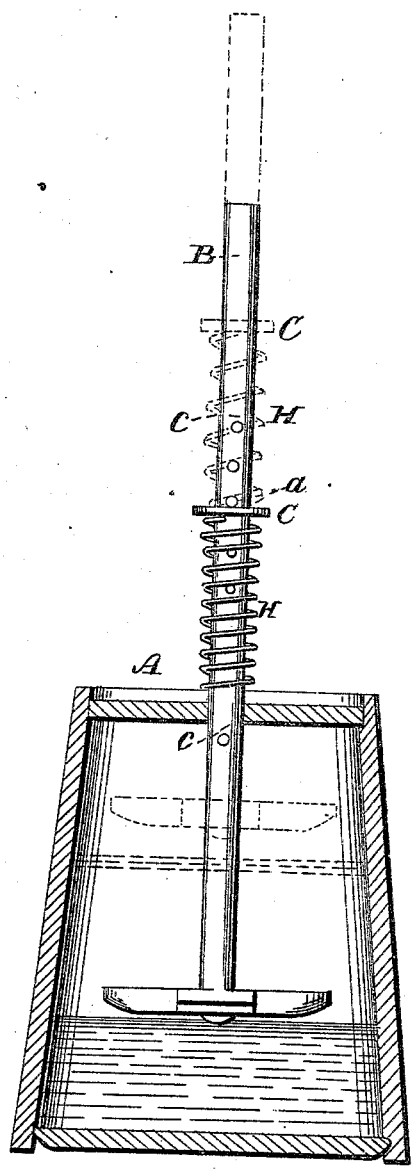

United States Patent Office.

CHARLES SWEENEY, OF EAST BLOOMFIELD, NEW YORK.

Letters Patent No. 85,187, dated December 22, 1868.

IMPROVEMENT IN CHURNS.

The Schedule referred to in these Letters Patent and making part of the same.

*To all whom it may concern:*

Be it known that I, CHARLES SWEENEY, of East Bloomfield, in the State of New York, have invented a new and useful Churn; and I do hereby declare that the following is a full, clear, and exact description thereof, reference being had to the accompanying drawing, making part of this specification, in which the figure is a vertical view of a churn, with a side elevation of the dasher, with my improvement attached.

The nature of my invention will be understood from the drawings and specifications.

To enable others skilled in the art to make and use my invention, I will describe its construction and operation.

I attach a spiral spring, H, to the dasher B of a common churn. The spring H is confined between the washer C and the cover A of the churn. In the dasher, a series of holes, c, is made, through which a pin, a, is put above the washer C, so that the dasher may be adjusted to suit the depth of cream in the churn, which is very desirable.

The object of my invention is to improve the common dasher-churn, and produce a cheap means of aiding the operator.

The operation is as follows:

The cream being put into the churn, the cover with the dasher is then put on; it being important to give a proper length to the dasher, so that if a small quantity of cream is used, the spring will not force the dasher above the cream on its upward motion, and will also allow it to go to the bottom in its downward action.

In this case the pin is put into a hole near the top of the dasher, which lengthens the spring, and allows the dasher to go down to the bottom of the churn.

When it is required to collect the butter, the washer is forced down on the dasher, and the pin put through a hole near the cover, which keeps the dasher from going down as far as required in churning the butter.

By this means the cream is not so much agitated (which is a desirable point) in collecting the butter.

The spring also assists the operator in raising the dasher.

I do not claim an adjustable spring for churn-dashers, when the adjustment is effected by means of a collar and a set-screw, as shown in the patent of John M. Buell, August 7, 1860, which arrangement of devices soon makes the dasher-rod very rough and disagreeable to handle, by the indentations and ruptures in the surface of the rod, unavoidably produced by the set-screw; but What I do claim as my invention, and desire to secure by Letters Patent, is—

The adjusting-pin *a*, receiving holes *c* in the dasher-rod B, in combination with the collar C, spring H, and head A, for the purposes set forth.

CHARLES SWEENEY.

Witnesses:
GEO. A. GAGE,
JAS. L. GAGE.